United States Patent [19]

Tingskog

[11] Patent Number: 5,351,810
[45] Date of Patent: Oct. 4, 1994

[54] CONVEYOR BELT

[75] Inventor: Lennart Tingskog, Helsingborg, Sweden

[73] Assignee: Conveytech Systems AB, Helsingborg, Sweden

[21] Appl. No.: 75,492

[22] Filed: Jun. 21, 1993

[30] Foreign Application Priority Data

Dec. 28, 1990 [SE] Sweden .................. 9004166-6

[51] Int. Cl.⁵ .................................. B65G 15/08
[52] U.S. Cl. ........................ 198/819; 198/847
[58] Field of Search ................... 198/847, 819

[56] References Cited

U.S. PATENT DOCUMENTS

| 387,964 | 8/1888 | Woodbury. | |
|---|---|---|---|
| 2,199,935 | 5/1940 | Johns | 198/819 |
| 2,839,180 | 6/1958 | Ackers | 198/819 |
| 3,595,378 | 7/1971 | Kamisaka | 198/819 |
| 4,410,082 | 10/1983 | McGinnis | 198/819 X |

FOREIGN PATENT DOCUMENTS

| 0050962 | 5/1982 | European Pat. Off. ......... | 198/819 |
|---|---|---|---|
| 1065772 | 9/1959 | Fed. Rep. of Germany. | |
| 1081588 | 12/1954 | France. | |
| 0085710 | 5/1982 | Japan | 198/819 |
| WO89/05765 | 6/1989 | PCT Int'l Appl.. | |
| 8905765 | 6/1989 | World Int. Prop. O. ......... | 198/819 |

Primary Examiner—D. Glenn Dayoan

[57] ABSTRACT

A conveyor belt, which is made of an elastic material, is made of a flat center piece which is flexurally rigid about the longitudinal axis of the belt owing to a transverse reinforcement and is but slightly extendible in the longitudinal direction owing to a longitudinal reinforcement; two flat edge pieces which are articulated to respective side edges of the center piece, are flexurally rigid about the longitudinal axis of the belt owing to a transverse reinforcement, are extendible in the longitudinal direction of the belt, and together have a width at least equal to the width of the center piece; and two link pieces which connect each respective edge piece with the center piece, are flexible about the longitudinal axis of the belt and extendible in the longitudinal direction of the belt, ar resilient to enable outward pivotal or folding movement of the edge pieces from a position in which the edge pieces are folded over the center piece, and have a width substantially smaller than that of the center piece. A longitudinal strip, which is fixedly connected to one side of the center piece and projects upwardly, is extendible in the longitudinal direction of the belt. The height of the strip is not substantially larger than the width of the link pieces and its transverse position on the center piece is such that the edge pieces, when folded over the center piece, are applied against the strip.

12 Claims, 4 Drawing Sheets

CONVEYOR BELT

BACKGROUND OF THE INVENTION

The present invention relates to a conveyor belt of the type described in WO 89/05765, filed on the 18th of Nov. 1988 by Lennart Tingskog, and in corresponding U.S. Pat. application Ser. No. 07/488055, now U.S. Pat. No. 5,060,787 issued Oct. 29, 1991, which is incorporated herein by reference.

Such a conveyor belt more specifically comprises a flat center piece which is flexurally rigid about the longitudinal axis of the belt owing to a transverse reinforcement and is but slightly extendible in the longitudinal direction owing to a longitudinal reinforcement; two flat edge pieces which are each articulated to one side edge of the center piece, are flexurally rigid about the longitudinal axis of the belt owing to a transverse reinforcement, are extendible in the longitudinal direction of the belt, and together have a width at least equal to the width of the center piece; and two link pieces which connect each edge piece to the center piece, are flexible about the longitudinal axis of the belt and extendible in the longitudinal direction of the belt, are resilient to enable outward pivotal or folding movement of the edge pieces from a position in which they are folded over the center piece, and have a width substantially smaller than that of the center piece.

This type of conveyor belt is advantageous by enabling a closed conveyance of goods, belt paths with tight horizontal and vertical bends and, consequently, horizontal, inclined and even vertical belt path portions, as well as loading and unloading at optional points along the conveying path. This conveyor belt is, in addition, of simple construction and comparatively inexpensive to manufacture, but nevertheless has a long service life even under severe operating conditions.

A conveyor with such a conveyor belt can have a compact design and does not require any complicated support, guide or driving rollers. Such a conveyor is exceptionally versatile, is environment-friendly and involves low production, operation and maintenance costs.

With a conveyor belt of the above type, there may, however, occur sealing difficulties along horizontal curves and steeply inclined or vertical path portions when conveying some types of goods, especially materials having a low internal friction, such as cement.

SUMMARY OF THE INVENTION

A first object of the present invention is, therefore, to improve the sealing of a conveyor belt of the i(D above type.

A second object of the invention is to enable transport of material having a low internal friction by means of such a belt, with an improved sealing function also along steeply inclined or vertical portions.

According to the present invention, the sealing function of a conveyor belt of the type mentioned in the introduction to this specification can be improved by equipping the belt with a longitudinal strip which is fixedly connected to and projects upwardly from one side of the center piece and which is extendible in the longitudinal direction of the belt, the height of the strip being smaller than or essentially equal to the width of the link pieces and the transverse position of the strip on the center piece being such that the edge pieces, when folded over the center piece, are applied against the strip.

Each edge piece can then be applied directly against the strip, but the edge pieces are conveniently overlapping when folded over the center piece, in which case the strip should be located within the overlapping area of the edge pieces. The pressure rollers or other pressure means employed for maintaining the edge pieces in the folded-over position then urge the edge pieces within the overlapping area into engagement against the longitudinal strip, i.e. a first of the edge pieces is urged so as to be applied directly against the strip, and a second of the edge pieces is urged so as to be applied against the first edge piece or, in other words, is applied indirectly against the strip. The force exerted by the pressure means will thus be transmitted to the center piece via the longitudinal strip, the center piece forming an abutment to the belt-closing pressure applied.

The conveyor belt according to the invention guarantees the inner volume of the conveyor belt, which enables transport of materials having a low internal friction, along horizontal bends in which the transverse direction of the belt is substantially parallel to an essentially vertical axis of the bend. By the improved sealing function and the force transmission to the center piece, the conveyor belt according to the invention can also be moved, with the center piece on the outside, through bends of a comparatively small radius of curvature, not the least since the tractive force on the belt, mainly taken up by the center piece, can be conducted through the bend without any appreciable alteration of the cross-sectional area of the belt.

In a preferred embodiment of the invention, the second object is achieved in that the conveyor belt is equipped with driver strips which are fixedly connected to the center piece and the longitudinal strip, on at least one side of the longitudinal strip, and which extend from the longitudinal strip to one side edge of the center piece.

Each driver strip has such a shape that, when the corresponding edge piece is folded over the center piece, it will seal against the edge piece and the associated link piece.

It will be appreciated that material of a low internal friction can thus be conveyed along steeply inclined or even vertical portions of the conveying path, since each driver strip then forms the bottom of a pocket for material in the conveyor belt.

To eliminate all pressure from the material in the pockets against the sealing area of the longitudinal strip, the driver strips can be so designed that the portions thereof closest to the longitudinal strip are not at right angles to the longitudinal direction of the conveyor belt. The driver strip can be straight, or the portion thereof closest to the side edge of the center piece can extend transversally of, i.e. substantially perpendicular to, the longitudinal direction the belt.

The driver strips may however also extend in their entirety substantially perpendicular to the longitudinal direction of the belt, in which case a certain pressure from the material will be applied against the sealing area between the longitudinal strip and the adjoining edge piece.

To enable a maximum conveying volume, the driver strips are preferably provided on both sides of the longitudinal strip, which then conveniently is located centrally on the center piece.

The longitudinal strip may, however, also be arranged closer to one side edge of the center piece, in which case the edge piece connected to the other side edge of the center piece is adapted, when folded over the center piece, to be applied directly against the longitudinal strip. In this embodiment, that portion of the inner volume of the conveyor belt which is located inwardly of the narrower edge piece can be used for collecting spillage material, i.e. material leaking through the seal between the longitudinal strip and the adjoining edge piece, and thus have no driver strips at all. The provision of driver strips is, however, convenient also in this case.

The sealing function becomes particularly reliable by the provision of an additional longitudinal strip adjacent to the longitudinal strip described above.

BRIEF DESCRIPTION OF THE DRAWING

The invention will be described in more detail below with reference to the accompanying drawings in which.

DESCRIPTION OF THE PREFERRED EMBODIMENTS

Figure 1:
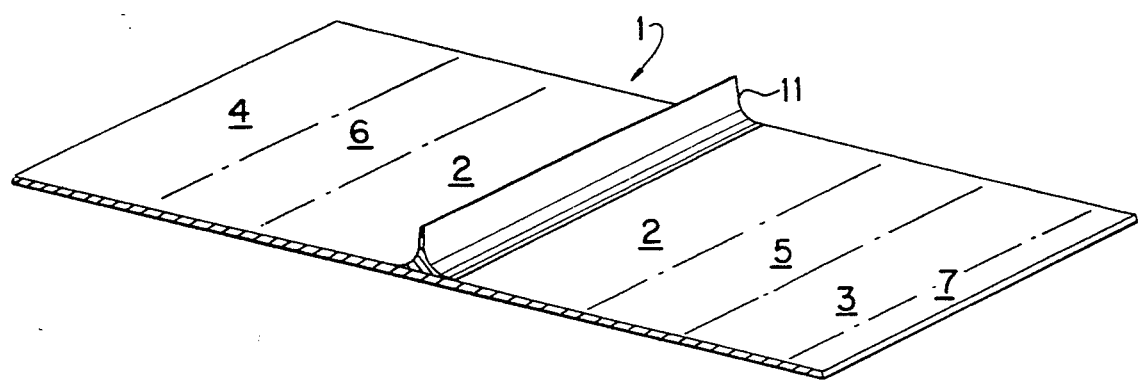
FIG. 1 is a perspective view of a first embodiment of a conveyor belt according to the invention in the unfolded state.
Figure 2:
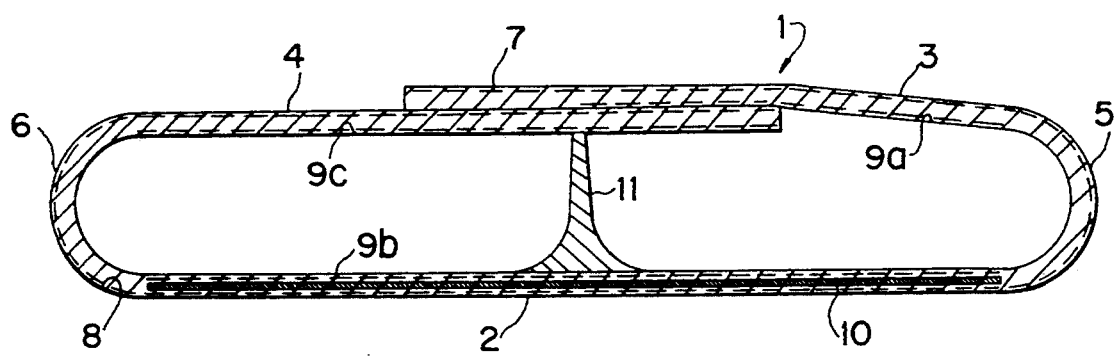
FIG. 2 is a cross-sectional view of the belt in FIG. 1 in the closed state.

The belt shown in FIGS. 1 and 2 consists of a center piece 2, two edge pieces 3, 4, and link pieces 5, 6 serving to connect the edge pieces 3, 4 to the center piece 2. The edge piece 3 is further connected to an extension portion 7, which however is optional. The belt 1 is made in one piece by vulcanizing several layers of e.g. rubber on each other, with different reinforcing layers provided therebetween.

In FIG. 2, which illustrates a preferred design of the reinforcing layers, a first reinforcing layer 8 extends over the entire width of the belt. This layer consists of transverse fibers or threads of considerable pulling and pressure resistance and is unsymmetrically arranged in the belt 1, i.e. relative to the geometric central plane of the belt. A second transverse reinforcing layer consists of three parts 9a, 9b and 9c whose extent corresponds to that of the edge piece 3, the center piece 2 and the edge piece 4, respectively. The part 9a may also extend over the extension portion 7. The reinforcing layer 9a, 9b, 9c is of the same type as the reinforcing layer 8. A third reinforcing layer 10 has the same extent as the center piece 2 and is provided between the reinforcing layers 8 and 9b. The layer 10 consists of longitudinal fibers or threads of a high pulling resistance. It may also be made up of conventional cord.

The fibers or threads in the reinforcing layers may consist of metal, such as steel, or plastic, such as polyester or polyamide, or carbon fibers. Apart from rubber, the belt 1 may be made of plastic or a mixture of plastic and rubber.

Thus, the conveyor belt 1 is preferably manufactured in a completely flat condition and is made up of a center piece 2 and two edge pieces 3, 4, which all are transversally rigid, i.e. flexurally rigid in the transverse direction of the belt or about the longitudinal axis thereof. The center piece 2 and the edge pieces 3, 4 will thus behave as substantially rigid plates which are articulated to one another by the link pieces 5 and 6. The high flexural rigidity is achieved by means of the reinforcing layers 8 and 9a, 9b, 9c which are spaced from each other in the direction of thickness of the belt and which possess a considerable pulling and pressure resistance in the transverse direction of the belt. Unlike the center piece 2, the edge pieces 3, 4 are extendible in the longitudinal direction of the belt, as are also the link pieces 5 and 6. However, the link pieces 5 and 6, which are flexible relative to the longitudinal axis of the belt, possess a certain springiness, which in this embodiment is achieved by the transverse reinforcing layer 8 and which, when the edge pieces are folded over the center piece, forces the edge pieces to pivot or fold outwards away from the center piece. This outward resilience should at least be strong enough to keep the edge pieces spaced over the center piece, but is preferably such that the edge pieces are swung out to the position illustrated in FIG. 1. Although the link pieces 5 and 6 thus should have a given springiness or a certain flexural resistance, this has to be much smaller than the flexural resistance of the center piece 2 and the edge pieces 3, 4, so that a defined link is obtained.

The extension portion 7 conveniently is of the same construction as the link pieces 5 and 6.

According to the present invention, the conveyor belt illustrated in FIGS. 1 and 2 is further equipped with a longitudinal strip 11 which is made of an elastic material, preferably the same material as the remainder of the belt 1. The strip 11 extends throughout the entire length of the belt and is fixedly connected to one side of the center piece 2 from which it projects upwards. The strip 11 is extendible in the longitudinal direction of the belt so as to allow the belt 1 to travel through bends. Further, the height of the strip 11 is smaller than or essentially equal to the width of the link pieces 5 and 6, and its transverse position on the center piece 2 is such that the edge pieces 3, 4, when folded over the center piece 2, will be applied against the strip 11.

As shown in FIG. 2, the edge pieces 3, 4 will overlap when folded over the center piece 2, the strip 11 being then located within the overlapping area of the edge pieces 3, 4.

The strip 11 can be made in one piece with the top layer of the belt 1, but may also form a separate element which is fixedly connected to the center piece 2, e.g. by vulcanization.

As described in the applications mentioned in the introduction to this specification, different pressure means are utilized for folding the edge pieces 3, 4 over the center piece 2. In the conveyor belt 1 according to the invention, the pressure exerted by these pressure means will thus be transmitted, via the edge pieces 3, 4, to the upper free edge of the strip 11 and, via this strip, to the center piece 2. An excellent sealing action between the edge pieces 3, 4 is thus ensured, so that goods contained in the closed conveyor belt of FIG. 2 cannot possibly escape from the interior of the conveyor belt 1.

With the conveyor belt 1 in the closed position illustrated in FIG. 2, material of a low internal friction, e.g. cement, can be conveyed in horizontal bends where the transverse direction of the belt is substantially vertical, since the strip 11 then safeguards the inner volume of the belt 1.

Owing to the improved sealing function and the force transmission to the center piece 2, the conveyor belt 1 according to the invention can also travel with the center piece 2 outermost through bends of a comparatively small radius of curvature. This is, inter alia, due to the fact that the tractive force on the belt 1, which is mainly taken up by the center piece 2, can be conducted through the bend without any appreciable alteration of the cross-sectional area of the belt 1 owing to the presence of the strip 11.

Figure 3:
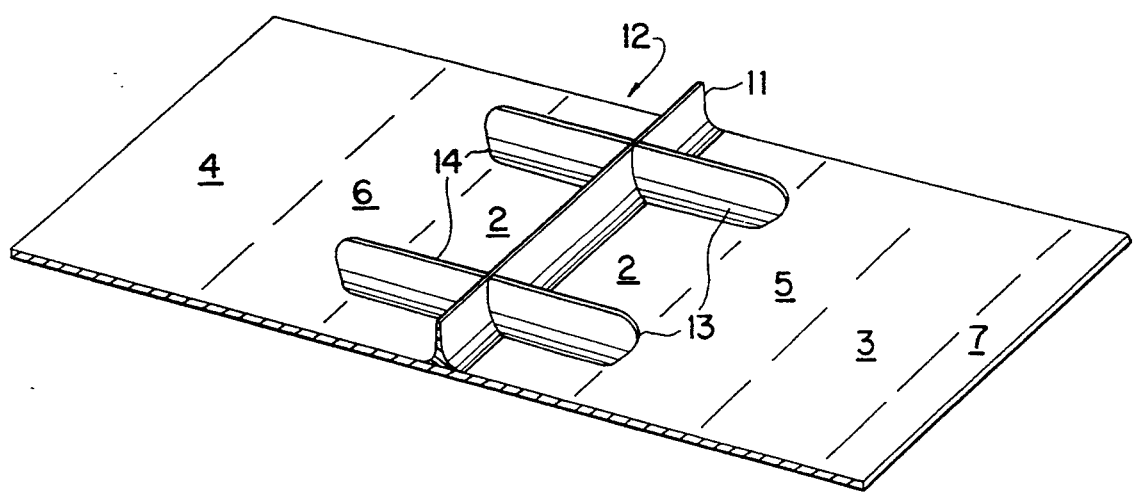
FIG. 3 is a perspective view of a second embodiment of a conveyor belt according to the invention in the unfolded state.
Figure 4:
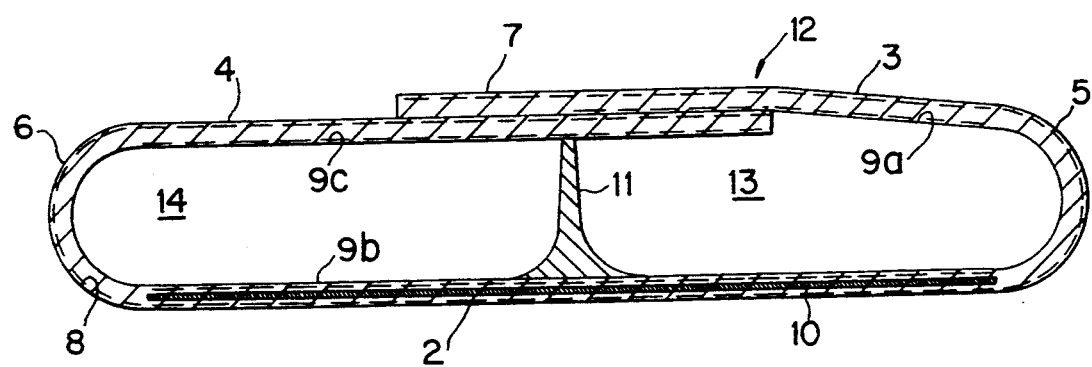
FIG. 4 is a cross-sectional view of the conveyor belt in FIG. 3 in the closed state.

FIGS. 3 and 4 illustrate a conveyor belt 12 which represents a second embodiment of the conveyor belt according to the invention. Like the conveyor belt 1 shown in FIGS. 1 and 2, the conveyor belt 12 is equipped with the longitudinal strip 11 and in addition has driver strips 13 and 14 on both sides of the longitudinal strip 11. The driver strips 13 and 14 extend substantially transversally of the longitudinal direction of the belt 12 and are fixedly connected to both the strip 11 and the center piece 2. The driver strips 13 and 14 have such a shape that, when the edge pieces 3, 4 are folded over the center piece 2, they will seal against these edge pieces as well as the link pieces 5, 6, as shown in FIG. 4.

Owing to the provision of the driver strips 13, 14, the belt 12 will exhibit a number of pockets when in the closed state. The bottom of each pocket is formed by a driver strip 13 or 14 and the sides of each pocket are formed by the strip 11, the center piece 2 and the link piece 5 and the edge piece 3, or the link piece 6 and the edge piece 4.

Figure 5:
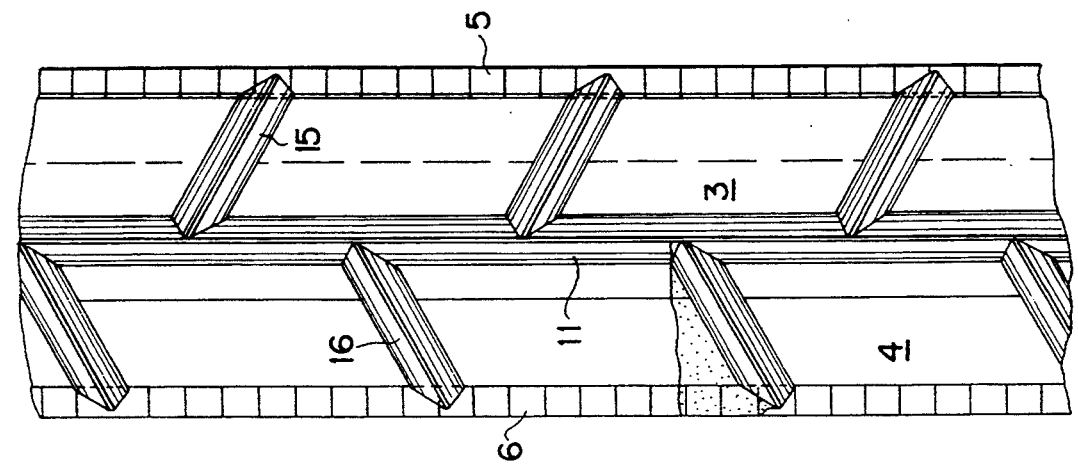

In the alternative embodiment of the conveyor belt 12 shown in FIG. 5, driver strips 15, 16 are not disposed at right angles to the longitudinal direction of the belt. On condition that the level of material in the pockets does not rise above that indicated in a pocket of FIG. 5, all pressure from the conveyed material against the sealing or closing area between the edge pieces 3 and 4, and between the edge piece 4 and the strip 11 is completely eliminated, even along steeply inclined or vertical portions of the conveying path.

Figure 6:
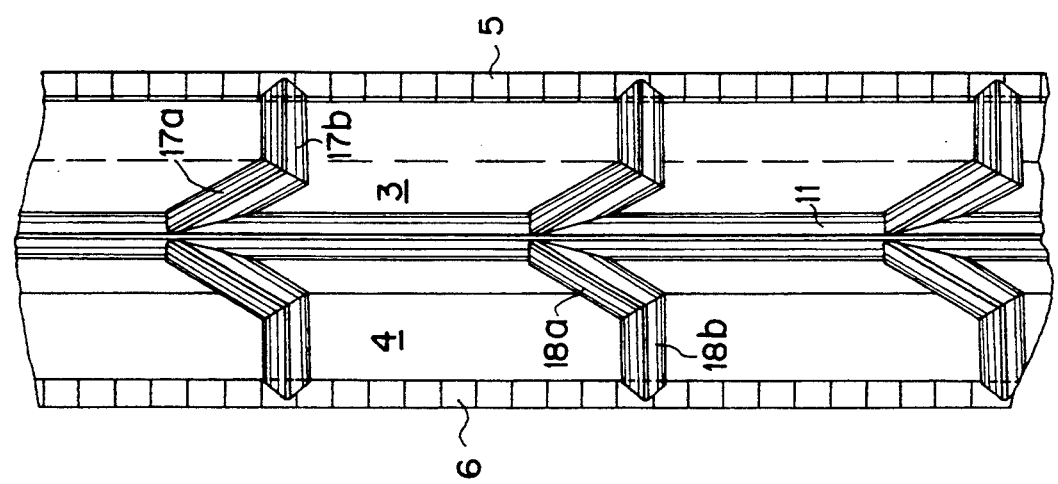

To increase the volume of the pockets, the driver strips can be arranged as in FIG. 6, i.e. such that the portions 17a, 18a of the driver strips closest to the longitudinal strip 11 are not disposed at right angles to the longitudinal direction of the conveyor belt, whereas the portions 17b, 18b of the driver strips closest to the side edges of the center piece 2 are disposed so as to extend transversally of or substantially perpendicular to the longitudinal direction of the belt.

Figure 7:
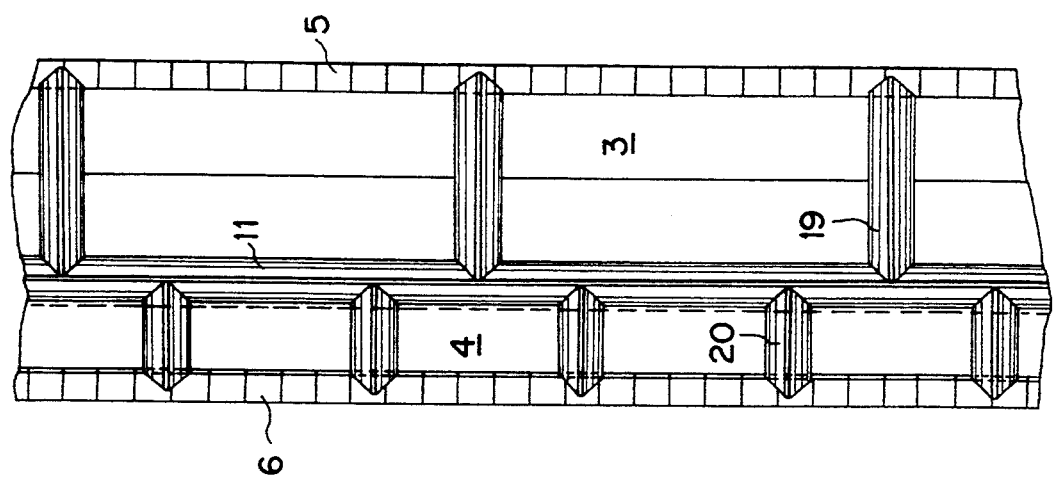
FIGS. 5, 6 and 7 schematically illustrate alternative embodiments of a conveyor belt according to the invention.

In the embodiment illustrated in FIG. 7, the longitudinal strip 11 is closer to one side edge of the center piece 2, the edge piece 3 connected to the other side edge of the center piece 2 being arranged, when folded over the center piece, to be applied directly against the longitudinal strip 11. Driver strips 19 are provided between the longitudinal strip 11 and the link piece 5, and driver strips 20 are provided between the longitudinal strip 11 and the link piece 6. Although the driver strips 20 are arranged with a smaller spacing than the strips 19, they may have the same spacing as these or even be dispensed with. In this embodiment, solely the pockets delimited by the driver strips 19 are advantageously used for the main transport of the material, whereas the pockets on the other side of the strip 11 serve to intercept material escaping through the sealing area between the strip 11 and the edge piece 3.

Alternatively, the strips 19 and/or 20 can be arranged non-perpendicular to the strip 11.

Generally, the driver strips should, unless extending solely perpendicular to the longitudinal direction of the belt, be spaced apart in the longitudinal direction of the belt by a distance at least equalling that between the ends of each driver strip in the same direction.

Driver strips extending completely transversally of the longitudinal direction of the belt are preferred when the belt along its conveying path moves upwards as well as downwards in steeply inclined or vertical portions.

Figure 8:
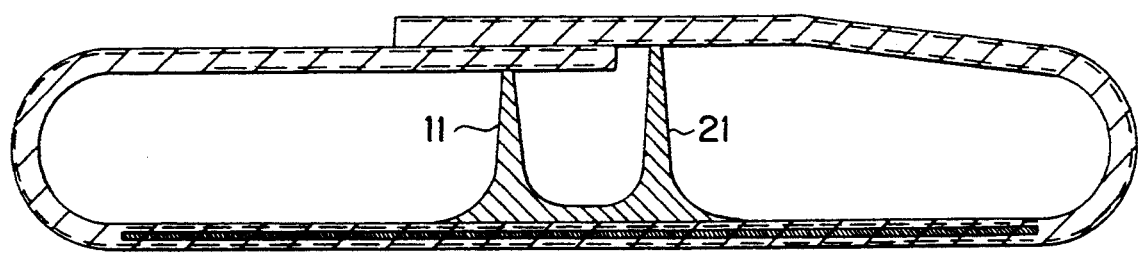
FIG. 8 is a cross-sectional view of yet another embodiment of a conveyor belt according to the invention.

The additional embodiment of a conveyor belt according to the invention shown in FIG. 8 is provided, in addition to the longitudinal strip 11 and optional driver strips, with an additional longitudinal strip 21 arranged adjacent to the strip 11 and fixedly connected to the center piece 2. The outer one of the edge pieces 3, 4 in the overlapping area is applied against the free edge of the strip 21, thus forming yet another sealing area.

Figure 9:
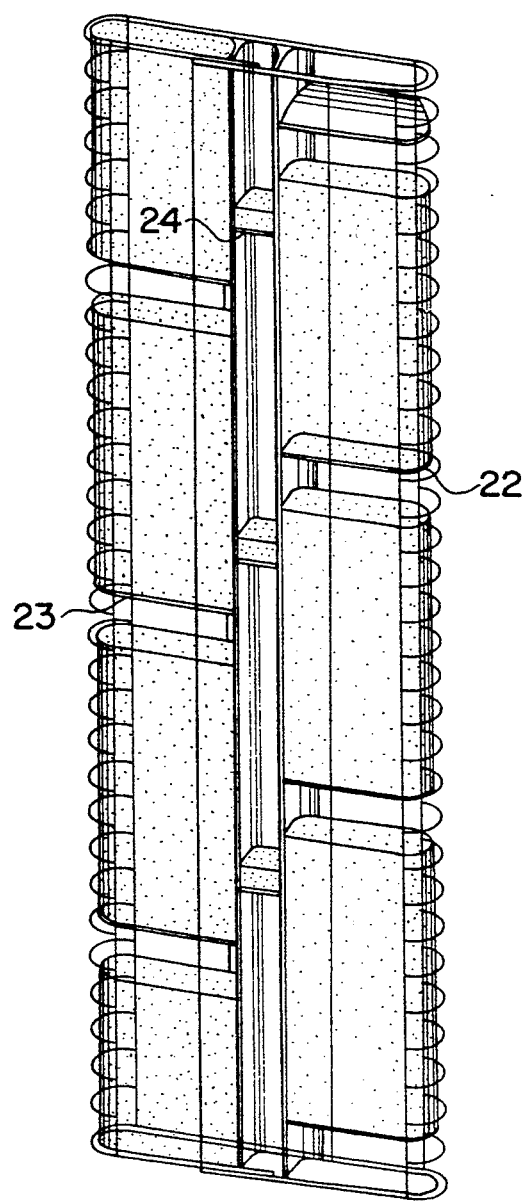
FIG. 9 is a schematic perspective view of the belt in FIG. 8 and illustrates the distribution of the conveyed goods along a vertical portion of the conveying path.

This embodiment of the conveyor belt is especially advantageous since the volumes on the sides of the strips 11, 21 facing away from each other can be employed for receiving the material to be transported, while the comparatively narrow space between the strips can be utilized for intercepting transported material which nevertheless escapes through the sealing area adjacent to the free edge of the strips 11 and 21, respectively. With driver strips 22, 23 and 24 according to FIG. 9, a considerable amount of the inner volume of the belt can be employed for transporting material when the belt is closed, as indicated in FIG. 9. As shown in FIG. 8, the strips 11, 21 may be formed in one piece.

It goes without saying that a great many modifications of the above embodiments of the conveyor belt according to the invention are conceivable within the scope of the appended claims.

I claim:

1. A conveyor belt comprised of an elastic material and comprising a flat center piece; transverse reinforcement rendering said center piece flexurally rigid about the longitudinal axis of the belt and longitudinal reinforcement rendering said center piece only slightly extendible in the longitudinal direction; two flat edge pieces which are each articulated to one side edge of the center piece, said edge pieces comprising transverse reinforcement rendering said edge pieces flexurally rigid about the longitudinal axis of the belt, said edge pieces being extendible in the longitudinal direction of the belt, and said edge pieces together having a total width at least equal to the width of the center piece; and two link pieces connecting said respective edge pieces with the center piece, said link pieces being flexible about the longitudinal axis of the belt and extendible in the longitudinal direction of the belt, said link pieces being resilient to enable outward pivotal or folding movement of the edge pieces from a position in which they are folded over the center piece, said link pieces having a width substantially smaller than that of the center piece; characterized by a longitudinal strip which if fixedly connected to an projecting upwardly from one side of the center piece, said longitudinal strip being extendible in the longitudinal direction of the belt, the height of the strip being not substantially larger than the width of the link pieces and the transverse position of the strip on the center piece being such that the edge pieces, when folded over the center piece, are applied against the strip.

2. A conveyor belt as claimed in claim 1, wherein the edge pieces overlap when folded over the center piece, and the strip is located within the overlapping area of the edge pieces.

3. A conveyor belt as claimed in claim 1 further comprising driver strips connected to the center piece and to the longitudinal strip on at least one side of the longitudinal strip and extending from the longitudinal strip to one side edge of the center piece.

4. A conveyor belt as claimed in claim 3, wherein each driver strip comprises surfaces which, when the corresponding edge piece is folded over the center piece, seals against the edge piece and the associated link piece.

5. A conveyor belt as claimed in claim 3 wherein the driver strips that is closest extend from the longitudinal strip at an angle other than a right angle to the longitudinal direction of the conveyor belt.

6. A conveyor belt as claimed in claim 3, wherein the driver strips are straight.

7. A conveyor belt as claimed in claim 3, wherein the driver strips extends transversally to the longitudinal direction of the belt.

8. A conveyor belt as claimed in claim 3, further comprising an additional longitudinal strip adjacent to the first-mentioned longitudinal strip, wherein when the edge pieces are folded over the center piece, one edge piece is applied directly against the additional longitudinal strip outside the overlapping area of the edge pieces.

9. A conveyor belt as claimed in claim 1, wherein the longitudinal strip is centrally located on the center piece.

10. A conveyor belt as claimed in claim 3, wherein the longitudinal strip is located closer to one side edge of the center piece, and the edge piece articulated to the other side edge of the center piece is adapted, when folded over the center piece, to be applied directly against the longitudinal strip.

11. A conveyor belt as claimed in claim 3, wherein the driver strips extend from the longitudinal strip at an angle other than a right angle, and then turn to intersect the side of the center piece substantially at a right angle.

12. A conveyor belt as claimed in claim 2, further comprising an additional longitudinal strip, wherein when the edge pieces are folded over the center piece, one edge piece is applied directly over the additional longitudinal strip outside the overlapping area of the edge pieces.

* * * * *

UNITED STATES PATENT AND TRADEMARK OFFICE
CERTIFICATE OF CORRECTION

PATENT NO. : 5,351,810
DATED : October 4, 1994
INVENTOR(S) : Lennart Tingskog

It is certified that error appears in the above-indentified patent and that said Letters Patent is hereby corrected as shown below:

Title page., delete "[73] Assignee: Conveytech Systems AB, Helsingborg, Sweden"

On page 1, add the following information after "Section [22]":

--PCT Filed: December 23, 1991; [86] PCT No: PCT/SE91/00903; §371 Date: June 21, 1993; 102(e) Date: June 21, 1993 (87) PCT Publication No.: WO92/12076; PCT Publication Date: July 23, 1992--.

Signed and Sealed this

Ninth Day of May, 1995

*Attest:*

BRUCE LEHMAN

*Attesting Officer*     *Commissioner of Patents and Trademarks*